_United States Patent Office_

3,475,187
Patented Oct. 28, 1969

3,475,187
EDIBLE INDELIBLE INK FOR PHARMACEUTICAL PELLETS
John R. Kane, Ambler, Pa., assignor to Rex Laboratories, Inc., North Wales, Pa., a corporation of Pennsylvania
No Drawing. Filed June 13, 1967, Ser. No. 645,587
Int. Cl. C09d *11/14;* C08d *27/76, 27/02*
U.S. Cl. 106—22                         4 Claims

ABSTRACT OF THE DISCLOSURE

A pharmaceutically acceptable, edible ink for use on gelatin capsules, tablets, and the like which consists essentially of about 5–20 parts by weight of a liquid dye, about 0.5–3 parts by weight of hydroxypropyl cellulose, hydroxypropyl methyl cellulose or a combination of both, about 2–10 parts by weight of alcohol, about 0.001–1 part by weight of a surface active agent, and sufficient water to make 100 parts, all these components being of pharmaceutical grade.

---

This invention relates to an edible, indelible ink, and it particularly relates to a pharmaceutical type ink which can be used to mark or color pharmaceutical capsules or tablets.

Pharmaceutical products, such as gelatin capsules or tablets (hereinafter generically referred to as pellets), have, heretofore, been marked or colored with ink compositions containing granular pigments in combination with a high proportion of an edible shellac. The shellac constituted the vehicle or carrier for the pigment, providing the viscosity necessary to apply the ink to the pellets. The shellac also served to provide sufficient "body" to the ink.

However, the pigment was generally easily rubbed-off by friction and, even in those instances where it adhered so strongly that it could not be easily rubbed-off, it could be easily washed-off or removed by solvents such as alcohol or the like, without causing any apparent damage to the surface of the pellet. This made it very easy for unscrupulous dealers to remove trademarks or other indicia and substitute one product for another. It also often caused removal of markings indicating the ingredients of the product, thereby destroying its utility. In addition, the high proportion of shellac not only added to the cost of the ink but constituted an additive to the finished product that had no pharmaceutical utility.

In accordance with the present invention, the aforementioned disadvantages are overcome by the utilization of a novel imprinting or coloring agent which does not depend on granular type pigments for its coloring effects and which is free of shellac. It is, furthermore, completely indelible in that it cannot be removed by friction or washed or dissolved away without, simultaneously, damaging or destroying the entire pellet so that it is no longer utilizable.

The above result is achieved by means of a composition containing edible liquid dyes which not only coat by impregnate the surface of the pellet and, in effect, achieve a chemical unity therewith. Furthermore, these dyes are in admixture with certain other ingredients that, although used in much smaller proportions than was heretofore the case with shellacs, supply all the viscosity and "body" that is resuired for the composition. These other ingredients comprise surface active or wetting agents such as are specifically exemplified by but not necessarily limited to polyoxyethylene sorbitan monolaurate and sorbitan monostearate, which supply the necessary viscosity, and either hydroxypropyl cellulose, hydroxypropyl methyl cellulose, or a combination thereof, which provides the "body." Any pharmaceutically acceptable alcohol, such as ethyl, isopropyl, isoamyl, isobutyl or secondary butyl alcohol is used as a solvent, while a small amount of a pigment may be added but only for the purpose of enhancing the surface clarity of the dye. However, the proportion of such pigment must be kept very small, preferably under 3 percent of the total composition, and in no event more than 5 percent, since any greater amount would destroy or seriously reduce the indelibility factor of the composition. Water is, by far, the largest component of the composition, serving as the carrier therein.

The present type of dye composition is particularly effective for use on gelatin capsules, but has also been found to be effective on polished pharmaceutical tablets and the like.

The following examples are illustrative of the present invention, with no intent, however, to limit the same except as claimed.

EXAMPLE 1

| Components: | Parts by wt. |
|---|---|
| FDC Red #2 Dye | 10.500 |
| FDC Blue #1 Dye | 5.000 |
| Hydroxypropyl cellulose (Klucel LP, Hercules) | 2.250 |
| Isopropyl alcohol | 8.000 |
| Carbon black (purified) | 2.000 |
| Polyoxyethylene sorbitan monolaurate (Tween 20—Atlas Chem. Corp.) | 0.002 |
| Sorbitan monostearate (Span 60–Atlas Chem. Corp.) | 0.002 |
| Distilled water | 72.246 |

The above components are mixed at room temperature and pressure until homogeneous to form a deep black coloring agent.

This coloring agent was applied to a gelatin capsule, of the type used to contain pharmaceuticals, by brushing it on the capsule under ambient temperature and pressure conditions. It was then permitted to dry in the air for about one hour. The resultant color was permanent in that it could not be rubbed-off and could not be washed or dissolved away without destroying the capsule itself.

EXAMPLE 2

| Components: | Parts by wt. |
|---|---|
| FDC Red #2 Dye | 16.000 |
| Isopropyl alcohol | 6.000 |
| Hydroxypropyl cellulose L.P. | 0.996 |
| Sorbitan monostearate (Span 60) | 0.002 |
| Polyoxyethylene sorbitan monolaurate (Tween 20) | 0.002 |
| Distilled water | 77.000 |

These components were mixed at room temperature and pressure until homogeneous to form a red coloring agent.

EXAMPLE 3

| Components: | Parts by wt. |
|---|---|
| FDC Violet #1 Dye | 14.000 |
| Isoamyl alcohol | 7.000 |
| Hydrorypropyl cellulose L.P. | 0.996 |
| Span 60 | 0.002 |
| Tween 20 | 0.002 |
| Distilled water | 78.000 |

These components were mixed at room temperature and pressure until homogeneous to form a violet coloring agent.

EXAMPLE 4

| Components: | Parts by wt. |
|---|---|
| FDC Green #3 Dye | 17.000 |
| Ethyl alcohol | 5.000 |
| Hydroxypropyl methyl cellulose (Methocel H.G.—Dow Chem. Co.) | 0.100 |
| Span 60 | 0.003 |
| Tween 20 | 0.003 |
| Distilled water | 77.894 |

There components were mixed together at room temperature and pressure until homogeneous to form a green coloring agent.

EXAMPLE 5

| Components: | Parts by wt. |
|---|---|
| FDC Yellow #6 Dye | 19.000 |
| Isopropyl alcohol | 8.000 |
| Hydroxypropyl cellulose L.P. | 0.500 |
| Hydroxypropyl methyl cellulose | 1.000 |
| Span 60 | 0.005 |
| Tween 20 | 0.005 |
| Distilled water | 71.490 |

These components were mixed together at room temperature and pressure until homogeneous to form an orange coloring agent.

EXAMPLE 6

| Components: | Parts by wt. |
|---|---|
| FDC Blue #1 Dye | 16.000 |
| Isopropyl alcohol | 6.000 |
| Hydroxypropyl cellulose L.P. | 0.996 |
| Span 60 | 0.002 |
| Tween 20 | 0.002 |
| Distilled water | 77.000 |

These components were mixed together at room temperature and pressure until homogeneous to form a blue coloring agent.

All of the above coloring agents are applicable to both gelatin capsules and tablets by standard type printing mechanisms, brushing, spraying, dipping or the like.

The specific range of proportions for each composition within the scope of this invention are as follows, the parts being by weight: 5–20 parts of the dye, 0.5–3 parts of the hydroxypropyl cellulose, 2–10 parts of the alcohol, 0.001–1 part of the surface active agent (whether one or two as disclosed in the examples), and the balance water. If a pigment is used, it is in a proportion of 0.5–5 parts, 5 parts being the maximum, but preferably being not more than about 3 parts. When used, the amount of pigment displaces an equal amount of water.

Obviously, many modifications of the present invention are possible in the light of the above teachings. It is, therefore, to be understood that within the scope of the appended claims, the invention may be practiced otherwise than as specifically described.

The invention claimed is:

1. A method of coloring a pharmaceutical pellet which comprises applying to the surface of the pellet an indelible coloring composition consisting essentially of about 5–20 parts by weight of a pharmaceutically acceptable liquid dye, about 0.5–3 parts by weight of a member of the group consisting of hydroxypropyl cellulose, hydroxypropyl methyl cellulose and mixtures thereof, about 2–10 parts by weight of a pharmaceutically acceptable alcohol, about 0.001–1 part by weight of a surface active agent, and sufficient water to make 100 parts by weight.

2. The method of claim 1 wherein the composition also includes about 0.5–5 parts by weight of a pigment.

3. A pharmaceutically acceptable indelible coloring composition consisting essentially of about 5–20 parts by weight of a pharmaceutically acceptable liquid dye, about 0.5–3 parts by weight of hydroxypropyl cellulose, about 2–10 parts by weight of a pharmaceutically acceptable alcohol, about 0.001–1 part by weight of a surface active agent, and sufficient water to make 100 parts by weight.

4. The composition of claim 3 wherein there is also present about 0.5–5 parts by weight of a pigment.

References Cited

UNITED STATES PATENTS

| 2,693,436 | 11/1954 | Spradling. | |
|---|---|---|---|
| 2,816,061 | 12/1957 | Doerr et al. | 424—34 XR |
| 3,043,747 | 7/1962 | Long | 424—34 |
| 3,251,824 | 5/1966 | Battista | 106—203 XR |
| 3,256,111 | 6/1966 | Singiser | 424—35 XR |
| 3,395,202 | 7/1968 | Yen | 106—19 XR |

JULIUS FROME, Primary Examiner

J. B. EVANS, Assistant Examiner

U.S. Cl. X.R.

106—23, 26, 193, 203, 204; 117—85, 166; 424—180, 35, 16